April 8, 1958   R. D. CROFT ET AL   2,829,437
METHODS AND APPARATUS FOR MEASURING LIQUID DEPTH
Filed Nov. 6, 1953

INVENTORS.
RICHARD D. CROFT
FRANKLIN VEATCH
BY
Campbell, Brumbaugh, Free & Graves
THEIR ATTORNEYS.

United States Patent Office 2,829,437
Patented Apr. 8, 1958

2,829,437

METHODS AND APPARATUS FOR MEASURING LIQUID DEPTH

Richard D. Croft, Chagrin Falls, and Franklin Veatch, Lyndhurst, Ohio, assignors to The Standard Oil Company, Cleveland, Ohio, a corporation of Ohio Application November 6, 1953, Serial No. 390,607

7 Claims. (Cl. 33—126.7)

This invention relates to methods and apparatus for measuring liquid depth and more particularly pertains to the employment of such methods and apparatus in a body of liquid having matter floating thereon.

It has been common practice to measure the depth of liquids in tanks or the like by the use of a conventional gauger's line consisting of a plumb bob supported by a calibrated line. The line is lowered until the plumb bob strikes the bottom of the tank and by observing the liquid level line on the line upon the subsequent withdrawal thereof, the liquid depth may be ascertained.

Difficulties have arisen, however, when such a gauge is employed in the presence of matter floating on the liquid. For example, to prevent evaporation a floating foam is employed in oil tanks, rendering it difficult, if not impossible, to find the exact oil level line on the line when it is withdrawn. Furthermore, since such foam varies in thickness over a period of time, it is impossible to provide an accurate error compensation therefor. Other coverings on other liquids to be gauged cause similar difficulties.

It is an object of the invention, accordingly, to provide methods and apparatus for determining the depth of a liquid having matter floating thereon.

It is another object of the invention to provide methods and apparatus of the above character which will also measure the liquid depth of uncovered liquids.

These and further objects of the invention are accomplished by providing a line carrying a buoyant slidably mounted element surrounding a portion thereof, the element normally engaging a closure device thereon. As the gauge is lowered into the liquid covered by floating matter, the closure device will become disengaged from the slidably mounted buoyant element permitting clean liquid to rise therein to the true liquid level.

These and further objects and advantages of the invention will be more readily understood when the following description is read in connection with the accompanying drawings in which.

Figure 1:
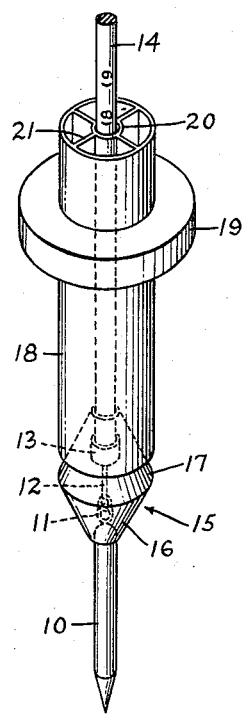
Fig. 1 is a perspective view of apparatus embodying the present invention.

Referring to the drawings and more particularly to Fig. 1, a plumb bob 10 is shown connected by an eyelet 11 at its upper end to a wire 12, in turn joined by a collar 13 to the lower end of a calibrated line 14 in any manner. It is obvious that the bob 10 may be attached to the line 14 in any other manner and may, if desirable, be completely omitted if a sufficiently heavy line is employed. The line 14 is shown as having a circular cross-section but it is obvious that flat lines or lines of other cross-sections may be employed.

The line 14 passes centrally through a member 18, preferably tubular as illustrated, which may be formed from aluminum or plastic, for example. Serving to center the line 14 in the tube 18 is a ring 20, supported by radial segments 21 joined to the inner surface of the tube. Attached to the upper portion of the tube 18 is a float 19, preferably having a ring-like configuration, with sufficient buoyancy to support the tube 18 in the liquid in which the apparatus is to be employed. The float 19 is disposed a sufficient distance below the top of the tube 18 to prevent any of the covering found on the liquid from entering therein. Furthermore a sufficient length of the tube 18 is provided below the float 19 to prevent any floating matter from entering the bottom of the tube in the event the float 19 is buoyed up by such matter.

Preferably mounted on the upper end of the plumb bob 10 and the lower end of the line 14 is a closure device 15 fitting the bottom of the tube 18 and preferably taking the form of a double cone consisting of a lower cone 16 and an upper cone 17. The cone 16 increases in diameter from that of the plumb bob 10 to a diameter somewhat greater than that of the tube 18 while the cone 17 decreases to a diameter less than that of the tube 18 to afford a closure for the lower portion thereof. The conical section 16 is provided so that the device will act as a spear in piercing any matter floating on the liquid to be gauged. It is obvious that a single cone section 17 may be utilized and mounted on the bob 10 or line 14 in any appropriate manner. Furthermore, other configurations for the closure device 15 may be utilized, the main requisite being that the lower end of the tube 18 may be sealed thereby. Thus, the lower portion of the member 18 is normally sealed by resting on the cone 17 held by the line 14.

Figure 2:
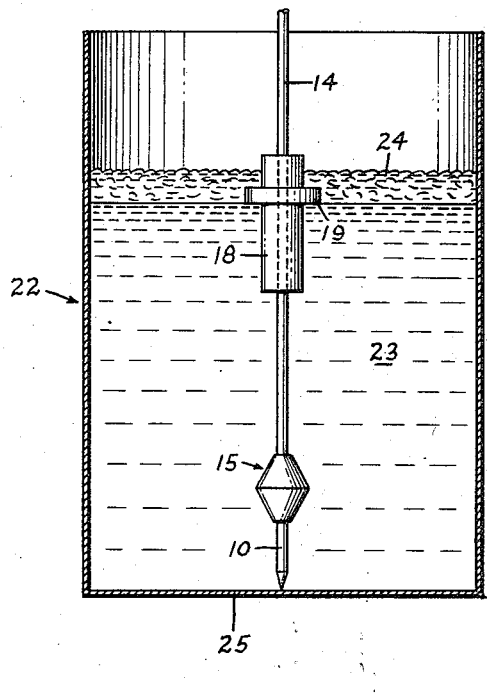
Fig. 2 is a schematic view of the apparatus illustrated in Fig. 1 in operation.

Examining a typical operation of this embodiment of the invention with particular reference being made to Fig. 2, the plumb bob 10 is lowered by the line 14 into a tank 22 having a bottom 25 containing a liquid 23 covered by floating matter 24. Upon the engagement of the float 19 with the surface of the liquid 23, the downward progress of the tube 18 will be interrupted and subsequent lowering of the line 14 will open the bottom of the tube 18 due to the disengagement of the cone 17. It will be understood that the float 19 may be partially or wholly buoyed up by the floating matter 24 with the same results. Accordingly, the clean liquid 23 will rise in the tube 18 and wet the line 14 at a point corresponding to the liquid level and to the depth of the liquid when the plumb bob 10 reaches the bottom 25. The entire assembly is subsequently withdrawn from the container 22 by means of the line 14 and an accurate indication of the liquid depth obtained therefrom.

It should be noted that the ring guide 20 does not engage the line 14 snugly, but is loosely fitted thereto in order to prevent the removal of any substantial amount of liquid as the apparatus is withdrawn therefrom.

Obviously, the methods and apparatus disclosed herein may be employed in depth measurements of liquids lacking a surface covering so that the invention provides, accordingly, general purpose measuring methods and apparatus with all of the attendant advantages flowing therefrom.

It will be understood that the above-described embodiment of the invention is illustrative only and modifications thereof will occur to those skilled in the art. For example, the line surrounding member 18 may be other than tubular and the closure device 15 will accordingly take other configurations necessary to sealably engage such member. Furthermore, the closure device 15 may be disposed at any convenient location on the line 14 or the plumb bob 10. Therefore, the invention is not to be limited to the specific apparatus disclosed herein but is to be defined by the appended claims.

We claim:

1. In a method for determining the depth of a liquid having matter floating thereon, the steps of surrounding a portion of a line with a buoyant member provided with a passage extending therethrough receiving the line, closing the lower end of the passage to prevent said surrounded portion of the line from coming in contact with the floating matter, lowering the surrounded portion of the line through the floating matter into the liquid, and placing the surrounded portion of the line in communication with the liquid below the floating matter.

2. In a method for determining the depth of a liquid having matter floating thereon, the steps of lowering a closed lower end of an empty container into the liquid through the matter, opening the lower end of the container when in the liquid, lowering an elongated measuring member through said container to the bottom of said liquid, and withdrawing said measuring member from the liquid.

3. A liquid measuring device comprising an elongated vertically disposed measuring element, a closure device mounted thereon, and a hollow buoyant protecting member normally surrounding a portion of said measuring element, said protecting member having its lower end normally closed by said closure device.

4. A liquid measuring device comprising an elongated vertically disposed measuring element, a hollow buoyant protecting member normally surrounding a portion of said measuring element, means for closing the lower end of said protecting member before the device is lowered into the liquid, said means being operative to open the lower end of the protecting member after said lower end has descended below the liquid level.

5. A depth measuring gauge adapted to be lowered into a body of liquid comprising an elongated vertically disposed measuring member, a closure device positioned thereon, and a hollow buoyant member slidably mounted on said measuring member and normally surrounding a portion thereof, the lower end of said buoyant member normally sealably engaging said closure device to protect the surrounded portion of said measuring member from the liquid during the initial encounter of the buoyant member therewith.

6. A liquid measuring device comprising a vertically disposed line and plumb bob assemblage, a hollow buoyant member normally surrounding a portion of said line, means on said assemblage to close the lower end of the member before the measuring device is lowered into the liquid, said means being operative for opening the lower end of the member to permit liquid to enter therein and contact the line as the device is further lowered into the liquid.

7. A depth measuring gauge adapted to be lowered into a liquid comprising a vertically disposed line and plumb bob assemblage, a closure device mounted on said line, a hollow tubular element slidably mounted on said line and normally surrounding a portion thereof, the lower end extremity of said tubular element normally sealably engaging said closure device, and buoyant means disposed on said tubular element, said buoyant means adapted to be supported by the liquid when the gauge is lowered therein whereby said seal will be broken.

References Cited in the file of this patent
UNITED STATES PATENTS

| | | |
|---|---|---|
| 1,570,790 | Smith | Jan. 26, 1926 |
| 2,040,552 | Gulick | May 12, 1936 |
| 2,139,899 | Le Bus | Dec. 13, 1938 |
| 2,627,660 | Smith | Feb. 10, 1953 |